April 28, 1925.
M. M. JONIAN
BEEHIVE ATTACHMENT
Filed Oct. 6, 1924
1,535,920
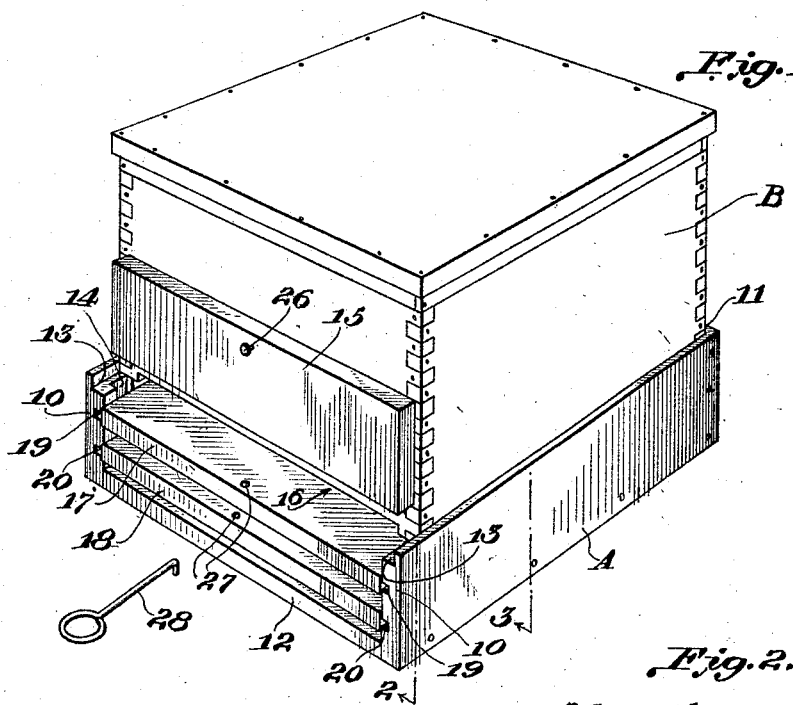
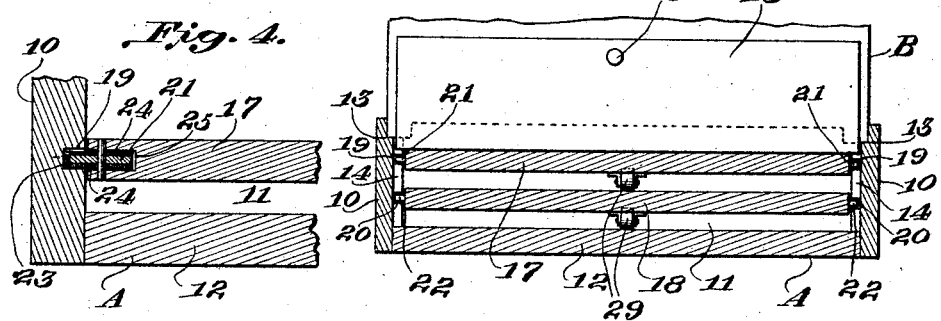
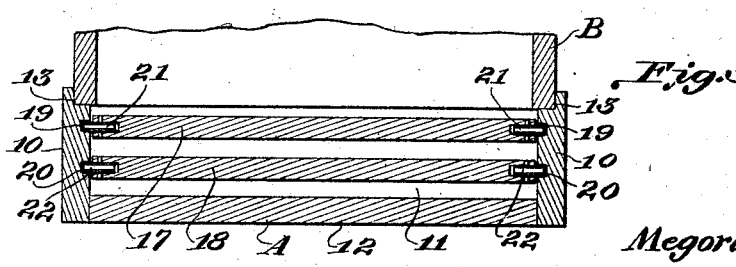
Inventor
Megordich M. Jonian
By
L. R. Morrill
Attorney Patented Apr. 28, 1925.

1,535,920

UNITED STATES PATENT OFFICE.

MEGORDICH M. JONIAN, OF CHELSEA, MASSACHUSETTS.

BEEHIVE ATTACHMENT.

Application filed October 6, 1924. Serial No. 742,043.

*To all whom it may concern:*

Be it known that I, MEGORDICH M. JONIAN, citizen of the Republic of Turkey, residing at Chelsea, in the county of Suffolk and State of Massachusetts, have invented certain new and useful Improvements in Beehive Attachments, of which the following is a specification.

This invention relates to bee hives and has for an object to provide an attachment for or auxiliary member to operate in conjunction with a bee hive of the usual and ordinary type providing improved means for cleaning the hive during the winter or period of semi-dormancy of the bees without disturbing the colony.

A further object of the invention is to provide a plurality of boards underlying the hive and spaced sufficiently below the bottom of the board frames to permit dead bees to fall on to the board and to be removed with the board for the purpose of eliminating dead bees and other excrement from the hive.

A further object of the invention is to provide boards for the purpose just mentioned which may be removed with the minimum disturbance to the colony.

With these and other objects in view, the invention comprises certain novel parts, elements, units, combinations, constructions, interactions, and functions as disclosed in the drawings together with mechanical and functional equivalents thereof as will be hereinafter more fully described and claimed.

In the drawings:

Figure 1 is a perspective view of a conventional bee hive associated with the attachment forming the subject matter of this application.

Figure 2 is a sectional view through the attachment in front of the hive as indicated by line 2—2 of Figure 1.

Figure 3 is a sectional view through the hive and attachment as indicated by line 3—3 of Figure 1.

Figure 4 is a detail sectional view showing the construction and association of one of the rollers.

Like characters of reference indicate corresponding parts throughout the several views.

It is well known that during the dormant period, as for instance the winter months, bees die and the death rate of bees is greatly accelerated by certain diseases to which the confined colony is subjected. It has been demonstrated that the death rate, owing to diseases, is greatly accelerated by the accumulation of dead bees in the hive, either through contagion or through the formation of noxious gases from the decomposition of the dead bees.

The present invention is directed to means for periodically extracting from the hives the accumulation of dead bees so that the remaining live bees will not be further subjected to the contagion or the effect of such gases.

The invention comprises a base indicated as an entirety at A which is employed as a support for the hive indicated conventionally at B. The particular type of hive is unimportant to the present invention and the showing of the type of hive as disclosed in the drawings is no limitation upon the invention which is an addition, or supplemental member, employed with such hive or such other hive as may be ordinarily employed.

The base A comprises side members 10 forming parallel walls with a rear wall 11 and bottom 12. Ordinarily this base will be composed of boards nailed together as indicated, but the exact manner of constructing is wholly unimportant to the present invention. The side members 10 are provided with rabbets 13 properly proportioned to co-act with the particular hive to which it is applied, so that the hive will sit into this rabbet and rest upon the shoulders formed by said rabbet, this being merely to insure the proper relation of the hive and base. At the front, the side members 10 are also provided with vertical furrows 14 properly proportioned to receive and co-act with a drop board 15 which slides therein under some conditions entirely into engagement with the bottom board 12 of the auxiliary and to close the bee entrance opening 16 as is the custom in the care of bees during the winter.

For the purpose of removing the accumulation of dead bees and other offal, however, a plurality of boards 17 and 18 are employed. While there have been two of these boards shown in the drawings, it is to be understood that the invention is no way limited to the use of two boards and the number may be more or less as experience may indicate as being necessary or desirable. These boards 17 and 18, or whatever number may be employed, are slidably inserted between the side walls 10 and under the hive by means of grooves 19 and 20 respectively. The boards 17 and 18 may be simply tongued to slide in such grooves 19 and 20, but such manner of association is not preferred for the reason that the boards sliding in such grooves are liable to stick and make the removal not only difficult, but such removal to disturb the bees, dormancy of which is a desirable feature. Preferably, therefore, the boards 17 and 18 are provided with rollers 21 and 22 respectively, which roll in the said grooves 19 and 20 making the removal of the boards easier for the operator and less disturbing to the contained bees. Also, it is desirable and forms a part of the present invention to line the inner surfaces of the grooves with a fabric 23 as indicated more particularly at the detailed Figure 4 and to cover both the top and the bottom of the rollers 21 and 22 with fabric 24. In this manner, only fabric comes in contact with the grooves 19 and 20 and the rollers themselves rotating in sockets 25 likewise make contact with the boards 17 and 18 upon their fabric sides only. By the employment of this fabric upon the opposite sides of the rollers and in the vertical bottoms of the grooves, the boards may be removed practically without noise or jar and the dormancy of the bees not disturbed.

In practice, of course, it will not be necessary that each hive be provided with more than one of the boards as one extra board may be slidably inserted beneath the board already in the hive, whereupon the drop board 15 is raised and the top board removed, the drop board then being dropped into engagement with the board beneath. From a patent point of view, however, a plurality of boards is desirable, so that at intervals during the dormant period, a board may be removed and cleaned and at a later period the next board below removed and cleaned and, as a final cleaning at the end of the dormant season, the bottom board 12 of the auxiliary may likewise be cleaned. It is not desirable to insert the board slidably into the auxiliary in such position that any of the bees may be crushed. So that, it is always desirable if a board is to be inserted that it be inserted below a board already in position occupying a part of the auxiliary not occupied by the bees.

For the purpose of properly manipulating the drop board, any convenient hand hold may be provided as indicated by the knob 26 and the boards themselves may be provided with means for facilitating their removal, as for instance the holes 27 in which case a hooked implement as indicated at 28 will be employed for drawing the board outwardly.

In some cases, it is found desirable for the purpose of convenience of manipulation to supply the several boards 17 and 18 with rollers 29 on their under sides which shall roll upon the underlying board or the bottom of the support as the case may be, assisting in the ready and convenient removal of the boards as required.

It will be understood that these boards will be removed periodically at such intervals as may be found necessary or desirable for removing the contagion and, when removed, a removed board may be cleaned and disinfected and employed in the next hive by inserting under the board already therein.

What I claim to be new is:

1. The combination with a bee hive, of a base proportioned to support the hive, a plurality of boards slidably removable from said base, and a closure for the bee entrance adapted to co-act with any of said boards to form a complete closure.

2. The combination with a bee hive, of a base comprising spaced side walls provided with corresponding horizontally positioned grooves, boards slidably inserted into and removable from said grooves, and a closure vertically slidable in front of the hive and adapted to engage any of said remaining boards.

3. The combination with a bee hive, of a base comprising spaced side walls, corresponding horizontal and vertical grooves formed in the proximate sides of said walls, boards slidably inserted in said horizontal grooves and removable therefrom beneath the hive, and a closure for the bee opening vertically slidable in the vertical grooves and proportioned to form closing contact with the remaining boards.

4. A base for a bee hive comprising spaced side walls, a bottom and one end wall, said side walls being provided with corresponding horizontal grooves and corresponding vertical grooves at the end opposite said closed end, boards slidable in said horizontal grooves, and a drop board vertically slidable in said vertical grooves into closing engagement with such boards as may remain in the horizontal grooves.

5. A base for a bee hive comprising spaced side walls provided with corresponding horizontal grooves, a cushioning member in the vertical bottom of said grooves, a board proportioned to be inserted between the side walls, rollers carried by the board proportioned to roll in said grooves with their perimeters in contact with the cushions, and cushioning disks attached to the rollers positioned to engage the horizontal sides of the grooves.

6. A sliding board for a bee hive base provided upon its opposite edges with sockets, rollers journaled in said sockets with a perimetrical arc of each roller extending beyond the edges of said board, and fabric disks forming the sides of some of said rollers and in engagement with the side walls of the sockets.

In testimony whereof I affix my signature.

MEGORDICH M. JONIAN.